Figure 1:
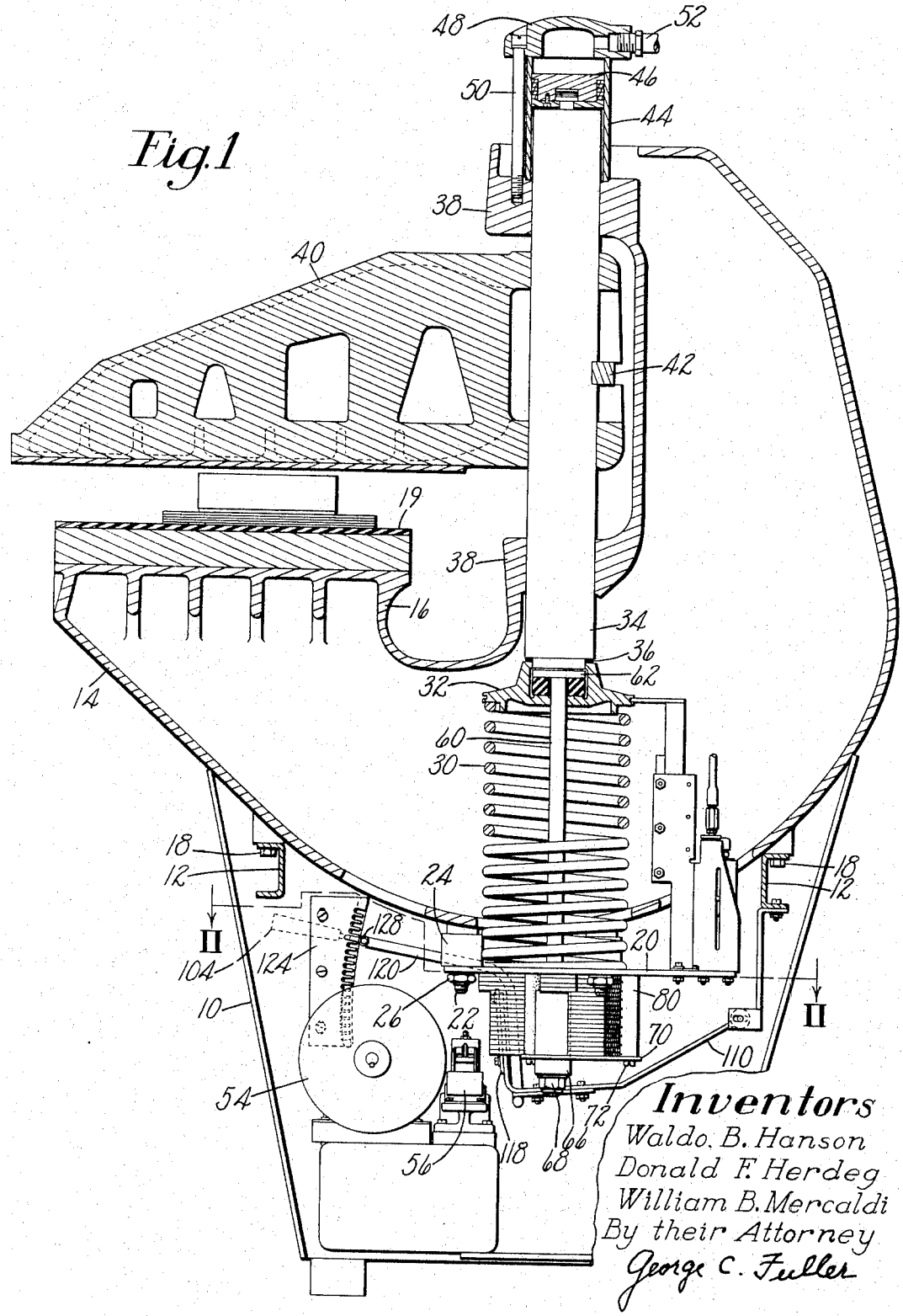

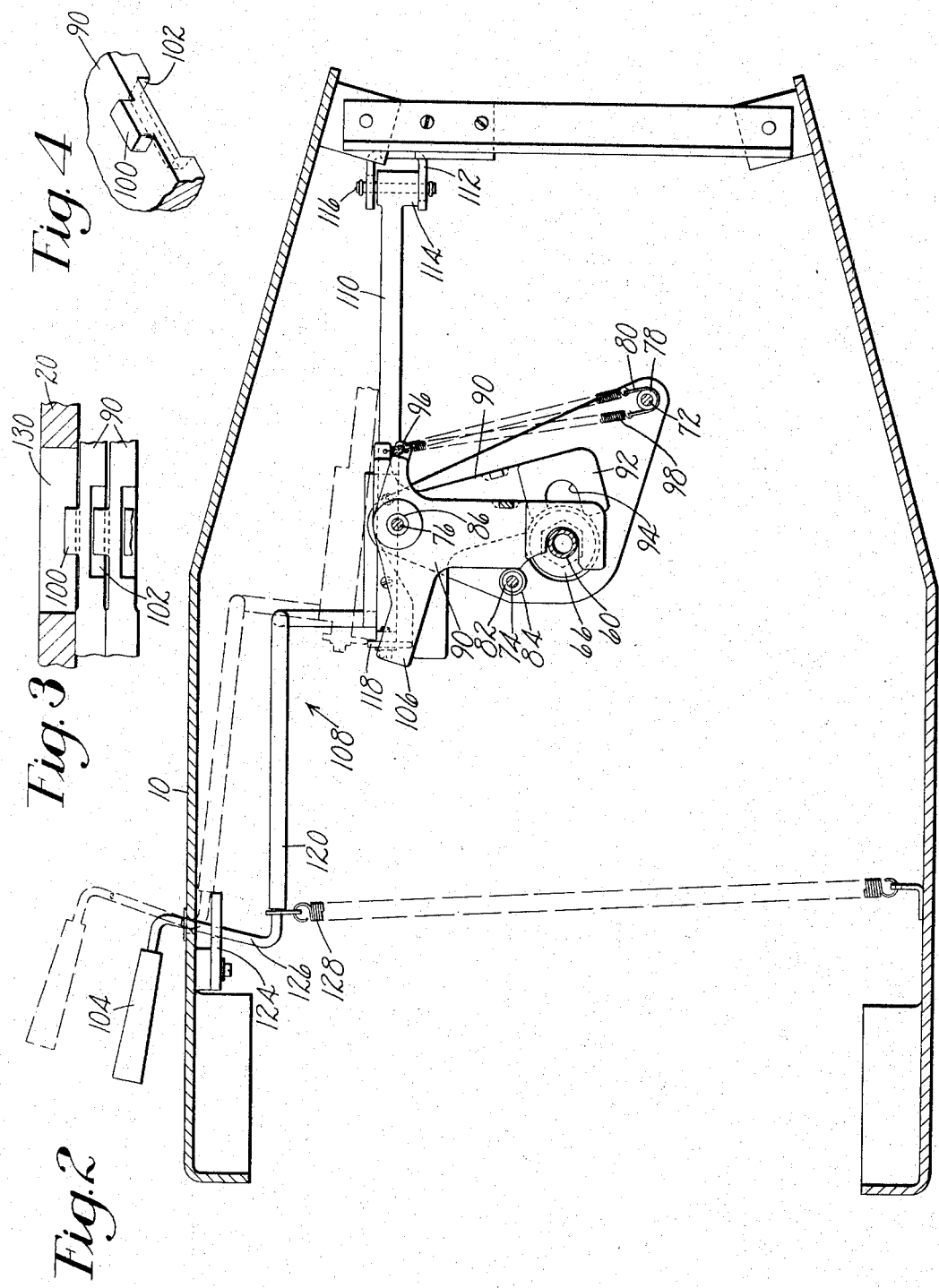

United States Patent Office 3,361,022
Patented Jan. 2, 1968

3,361,022
CUTTING PRESSES HAVING MEANS FOR ADJUSTING THE REST POSITION
William B. Mercaldi and Donald F. Herdeg, Beverly, and Waldo B. Hanson, Rowley, Mass., assignors to United Shoe Machinery Corporation, Flemington, N.J., a corporation of New Jersey
Filed Dec. 14, 1965, Ser. No. 513,723
5 Claims. (Cl. 83—529)

This invention relates to die cutting presses and more particularly to improvements in swinging beam hydraulic die cutting presses for facilitating adjustment of the upper or rest position of the beam.

In presses of the type above referred to, wherein parts are cut from sheet material by using the beam to press dies through work pieces supported on a cutting support, it is well known that it is desirable to minimize the distance by which the beam clears the dies prior to the cutting stroke in order to achieve optimum productivity. For this reason a number of approaches have been made toward economically providing means for conveniently adjusting the rest position of the beam. The means so far proposed, including hand wheel screws, power operated screws, and hydraulic controls, have left something to be desired with respect to combining ease of adjustment with low cost.

Accordingly, it is an object of the present invention to provide in a machine of the foregoing type means for selectively determining the rest position of the beam at any one of different heightwise spacings from the work support, which means will be both economical to construct and easy to operate in changing the selected height.

To this end and in accordance with a feature of the present invention there is provided, in a press of the foregoing type having a work support, a presser member movable in cutting strokes toward and away from the work support and means for reciprocating the presser member, in combination therewith, stop means comprising an abutment associated with said presser member, and a plurality of elements mounted for movement selectively into and out of the path of said abutment. As illustrated, the elements comprise superimposed shims mounted for movement selectively between an operative position between said abutment and a fixed abutment and an inoperative position wherein a shim is out of the space between said abutments. Also illustrated are manually operated shim positioning means for disposing a selected member of said shims in operative disposition As illustrated, the positioning means comprises means urging each shim into operative position and means controlled by a handle readily accessible to the operator for selectively applying to one or more shims an opposing force. These and other features and advantages of the invention will best be understood from the following description taken together with the accompanying drawings in which:

FIG. 1 is a side elevation partly in section of a cutting press embodying the present invention;
FIG. 2 is a section taken on line II—II of FIG. 1;
FIG. 3 is a fragmental section on an enlarged scale of a portion of shims shown in FIGS. 1 and 2, and
FIG. 4 is a fragmental angular view on the same scale of a portion of a shim shown in FIG. 3.

Referring to FIG. 1, the illustrative cutting press has a fabricated base 10 comprising transverse channel irons 12. A cast C-frame having an integral table portion 16 is secured to the channel irons 12 by bolts 18. The portion 16 carries a work support comprising a cutting pad 19.

A main plate 20 is secured to the bottom portion of the C-frame, being supported on three studs 22 (one shown in FIG. 1) each carrying a spacer 24 and a nut 26. Supported on the plate 20 is a large return spring 30 which extends through a hole in the bottom of the casting and is held at its lower end from substantial lateral displacement by the three spacers 24 which are disposed about the lower coils of the spring at 120° intervals. The upper end of the spring 22 is capped with a spindle support 32 carrying a vertically movable spindle 34 on thrust bearings 36. The spindle extends vertically through spindle bearing portions 38 of the C-frame and carries a horizontal beam 40 attached to the spindle by means comprising a key 42. A pressure cylinder 44 mounted on the upper bearing portion 38 contains a piston 46 rotatably mounted on the upper end of the spindle. The top of the cylinder is closed by a cap 48 secured to the portion 38 by bolts 50. The cap 48 accommodates inlet means 52 for hydraulic pressure fluid provided by a pump 54 under control of a solenoid valve 56.

Extending axially through the spring 30 is a tube 60 to the upper end of which, within the spindle support 32, a circular plate 62 is welded. Beneath the plate 62 and confined within the spindle support is an annular rubber bumper 64 which serves to absorb some of the shock when the rising spindle support 32 is checked as hereinafter described.

The lower end of the tube 60 extends downwardly through a closely fitting hole in the plate 20 and through a wooden cylinder 66 to a nut 68 threaded onto the bottom end of the tube. Accordingly, the cylinder 66 is associated with the presser member for heightwise movement therewith.

The bottom end of the tube 60 with the wooden cylinder 66 also extends through a clearance hole in a bottom plate 70 which is attached in parallel relation to the main plate 20 by three screws 72, 74 and 76 spaced as shown in FIG. 2. Referring to FIG. 2, the screw 72 carries a spacer 78 around which is wrapped a U-shaped spring anchor 80. The screw 74 carries a spacer 82 around which is a rubber sheath 84. The screw 76 carries a spacer 86 which acts as a pivot for a plurality of T-shaped shims 90 formed suitably of molded phenolic resin, for example.

Each shim 90 has a long arm 92 formed at its outer end with a U-shaped laterally directed slot 94 adapted to receive the tube 60 but not the wooden cylinder 66. Each shim 90 has a short arm 96 from the tip of which a spring 98 extends to the anchor 80. To provide room for the springs 98, they are secured alternately to one and the other edge of the anchor 80. It will be seen that the springs 98 urge the shims clockwise, as seen in FIG. 2, into operative position in which an end portion of each arm 92 is interposed between a downwardly facing abutment surface of the plate 20 and the upwardly facing end surface of the cylinder 66.

When all the shims are in their operative disposition, the cylinder 66 abuts the bottom shim 90 and the lowest rest position of the beam is thereby determined. The interposing or effective spacing portion of each shim is suitably ¼″ in thickness. Accordingly, by progressively moving the shims one after another from operative into inoperative disposition starting from the bottom shim, the rest position of the beam may be adjusted selectively upwardly in steps of ¼″. It will be appreciated that it is important to insure against the possibility of a given shim being disposed in operative position without all shims above it also being in operative position to support the given shim from damage by the impact of the cylinder 66 in the return portion of the cutting stroke. Accordingly, each shim is provided with an integral lug 100 (FIGS. 3 and 4) and a recess 102 for receiving the lug of the next lowest shim. The lugs and the recesses cooperate to require as a necessary condition of moving a shim to its operative position that all shims above it are in operative disposition, such cooperation also insuring against movement of a shim out of operative disposition without moving all lower shims to inoperative disposition.

Manually controlled means for effecting pivotal movement of the shims selectively between their operative and inoperative positions comprises the springs 98 and a handle 104 readily accessible to the operator controlling means for moving the shims selectively out of operative position by applying counterclockwise pressure to intermediate shim legs 106. To this end, a shim stop lever 108 provided with the handle 104 has a first portion 110 pivoted between the legs of a U-shaped bracket 112 welded to the base 10, a cylindrical end 114 of the portion 110 having a transverse aperture through which passes a pivot rod 116 which is received in slots in the bracket 112, the slots providing for a limited amount of horizontal swinging movement of the portion 110 in addition to its vertical rotation about the rod 116. At its distal end, the portion 110 makes a right angle upward turn beside the intermediate legs 106 of the shims and to this end is secured a rectangular metal plate forming a shim stop 118. Attached to said first portion 110 below the shim stop 118 is a second portion 120 of the shim stop lever 108 which, in the form of an upwardly and laterally extending rod, terminates at the handle 104 exterior of the base 10. Where the rod passes through the frame 10 there is provided a comb 124 having a plurality of teeth corresponding to different numbers of the shims 90 which teeth are adapted to engage a shank part 126 of the second portion 120 when the rod is urged inwardly, as shown in FIG. 2, but to clear the rod when the handle 104 is moved outwardly to its phantom position indicated. A spring 128 normally urges the portion 120 inwardly, as shown in FIG. 2, thus yielding maintaining engagement of the portion 126 with the comb 124.

In operation, the handle 104 of the illustrative press will normally be disposed as shown in FIG. 2 with the shank part 126 in engagement with the comb 124 at a selected heightwise position. The shim stop 118 will be correspondingly positioned heightwise in engagement with the sides of intermediate legs 106 of a group of vertically adjacent shims including the bottom shim, thus holding these shims in inoperative position through the force of the spring 128. When the operator wishes to change the height of the rest position of the beam 40, he pulls the handle 104 outwardly to the disengaged or dashed position shown in FIG. 2, wherein the shank part 126 clears the comb 124, and moves it up or down to an engaged position corresponding to the desired rest position and releases it. If the new rest position is downward of the former position, the handle 104 will be moved downwardly and, when released, inwardly by the spring 128 whereby the shank part 126 is returned to full engagement with the comb 124 as shown in FIG. 2, although at a different height-wise position. This full inward movement is possible because the shims with which the shim stop 118 engages are not in operative loaded position and therefore are free to be pivotally displaced. The shims above the shim stop 118, now released, will be urged toward operative position by the springs 98 but can only move far enough for the long arms 92 to engage the cylinder 66. However, on the next stroke of the cutting press, when the cylinder 66 moves downwardly, these released shims can move inwardly to operative position and cooperate with the shims already in operative disposition to provide spacing means between the cylinder 66 and the plate 20 upon the return portion of the stroke cycle. Correspondingly, if the adjustment of the handle 104 is upward, the shim stop 118 will encounter the sides of one or more of the shims 90 disposed in operative position and therefore the spring 128 can move the lever 108 inwardly only part way although sufficiently for the shank part 126 to engage the teeth of the comb 124. At the next stroke of the press, when the compression load is taken from the shims stacked in operative disposition, the shims are freed for rotation, and the shims whose intermediate arms 106 are engaged by the shim stop 118 will be rotated to inoperative disposition by the force of the spring 128. Thus the height of the spacing means provided by the shims remaining in operative disposition, which are the shims selected by the heightwise positioning of the handle 104, is effectively decreased permitting the beam 40 to rise to a higher rest position. It will be seen that by virtue of the operation of the lugs 100 in cooperation with the recesses 102 that it will be impossible for the cylinder 66 to encounter a shim 90 which is not supported by shims between it and the plate 20. Rather than provide a special top shim without a lug 100, the plate 20 has been provided with a clearance hole 130, FIG. 3, providing for movement of the lug of the upper shim within the necessary range of movement.

Having thus described our invention, what we claim as new and desire to secure by Letters Patent of the United States is:

1. In a cutting press having a work support, a presser member movable toward and away from said support for pressing dies through work pieces on the support, and power means for reciprocating the presser member to effect cutting strokes thereof, in combination therewith, selective stop means for stopping the movement of the presser member away from the work support at any one of a plurality of rest positions comprising an abutment associated with said presser member for movement therewith and a plurality of elements mounted for movement selectively into and out of the path of movement of said abutment for engagement therewith whereby the rest position of said member is determined in accordance with the selective positioning of said elements.

2. Apparatus as in claim 1 and additionally comprising manually operable means comprising a readily accessible control member for positioning said elements selectively to determine the rest position of the presser member.

3. Apparatus as in claim 2 in which said selective stop means comprises a fixed abutment, a second abutment associated with said presser member for movement toward the fixed abutment with movement of the presser member away from the work support, and a plurality of shims mounted for individual movement into and out of operative disposition between said abutments and in which said manually operable positioning means comprises means for positioning one or more of said shims selectively in operative disposition between such abutments.

4. Apparatus as in claim 3 in which said shims are superimposed and mounted for individual rotation, on a common axis parallel to the direction of movement of the movable abutment, into and out of operative disposition between said abutments, and in which the manually operable means for positioning one or more of said shims selectively between said abutments comprises means yieldingly urging said shims individually into said operative disposition and sprng means controlled by a manually operable lever selectively for applying to one or more of said shims an opposing force operative to move such shims out of operative disposition.

5. Apparatus as in claim 4 and further characterized in that at least one of said shims carries on one side thereof a lug extending axially therefrom for engaging an adjacent shim to prevent movement of said one shim into operative disposition without said adjacent shim being in operative disposition.

References Cited

UNITED STATES PATENTS

| | | | |
|---|---|---|---|
| 1,909,161 | 5/1933 | Ballard | 83—529 |
| 2,910,898 | 11/1959 | Martindell | 83—527 X |
| 3,208,324 | 9/1965 | Salway-Waller | 83—527 |

ANDREW R. JUHASZ, *Primary Examiner.*